US012078256B2

(12) United States Patent
Fowler et al.

(10) Patent No.: US 12,078,256 B2
(45) Date of Patent: Sep. 3, 2024

(54) OSCILLATING VALVE

(71) Applicant: Neptune Technology Group Inc., Tallassee, AL (US)

(72) Inventors: Jeffrey M. Fowler, Lawrenceville, GA (US); David Hamilton, Auburn, AL (US)

(73) Assignee: Neptune Technology Group Inc., Tallasee, AL (US)

( * ) Notice: Subject to any disclaimer, the term of this patent is extended or adjusted under 35 U.S.C. 154(b) by 238 days.

(21) Appl. No.: 17/551,503

(22) Filed: Dec. 15, 2021

(65) Prior Publication Data
US 2022/0205548 A1 Jun. 30, 2022

Related U.S. Application Data

(60) Provisional application No. 63/130,967, filed on Dec. 28, 2020.

(51) Int. Cl.
*F16K 17/18* (2006.01)
*F16K 31/365* (2006.01)
(Continued)

(52) U.S. Cl.
CPC ............ *F16K 17/18* (2013.01); *F16K 31/365* (2013.01); *F16K 31/385* (2013.01); *F16K 39/02* (2013.01); *H02J 50/001* (2020.01); *H02J 50/10* (2016.02); *Y10T 137/7764* (2015.04); *Y10T 137/7769* (2015.04); *Y10T 137/777* (2015.04); *Y10T 137/7836* (2015.04)

(58) Field of Classification Search
CPC ......... Y10T 137/7836; Y10T 137/7764; Y10T 137/7769; Y10T 137/777; F16K 17/18; F16K 31/365; F16K 31/385; F16K 39/02; H02J 50/001; H02J 50/10; H02J 7/32
USPC ............ 137/510, 489, 490, 491, 492, 492.5; 251/30.01–30.5, 33–38, 43–46, 113
See application file for complete search history.

(56) References Cited

U.S. PATENT DOCUMENTS

| 258,432 A | * | 5/1882 | Keith | ......................... F16K 1/20 |
| | | | | 251/303 |
| 1,059,037 A | * | 4/1913 | Collar | ....................... F16K 1/20 |
| | | | | 251/44 |

(Continued)

FOREIGN PATENT DOCUMENTS

FR 1291296 A 4/1962
FR 1470792 A 2/1967

*Primary Examiner* — William M McCalister
(74) *Attorney, Agent, or Firm* — Snyder, Clark, Lesch & Chung, LLP

(57) ABSTRACT

Systems and methods described herein provide a pilot-operated oscillating valve including a diaphragm. The valve is configured such that when the diaphragm is in a closed position, pressure of a fluid supply opens the valve, and when the diaphragm is in an open position, the pressure of the fluid closes the valve. The oscillating valve may further include an actuator that can cause the valve to be arrested selectively in the open position or the closed position depending on a state of the actuator. The state of the actuator is switchable with a small expenditure of energy, enabling an extended duty cycle for a battery or other power source associated with the actuator. In some implementations, energy from the oscillating movement of the diaphragm may be captured to recharge the battery for the actuator.

20 Claims, 13 Drawing Sheets

(51) Int. Cl.
*F16K 31/385* (2006.01)
*F16K 39/02* (2006.01)
*H02J 50/00* (2016.01)
*H02J 50/10* (2016.01)

(56) References Cited

U.S. PATENT DOCUMENTS

| | | | | |
|---|---|---|---|---|
| 1,128,228 A * | 2/1915 | Collar | ................ | F15B 13/0405 251/35 |
| 2,280,615 A * | 4/1942 | Baldwin | ............... | B60T 15/048 251/114 |
| 2,283,513 A * | 5/1942 | Smith | .................... | B21D 51/34 126/362.1 |
| 2,350,202 A * | 5/1944 | Thomas | .................. | F28G 1/166 165/95 |
| 2,377,227 A * | 5/1945 | Griswold | ............. | F16K 31/385 137/489.5 |
| 3,008,683 A * | 11/1961 | Filliung | .................... | E03D 3/04 251/30.03 |
| 3,291,439 A * | 12/1966 | Goldstein | ................. | E03D 3/06 251/100 |
| 3,380,469 A * | 4/1968 | Salerno | .................. | B64D 13/06 251/44 |
| 3,399,689 A * | 9/1968 | Keane | ...................... | F16K 31/42 137/220 |
| 3,415,269 A * | 12/1968 | Salerno | .................. | F16K 31/42 251/35 |
| 3,476,353 A * | 11/1969 | Stampfli | ............... | F16K 31/402 251/30.02 |
| 3,566,907 A * | 3/1971 | Sime | ................... | F16K 37/0008 137/553 |
| 3,568,706 A * | 3/1971 | Weise | .................. | F16K 17/105 137/112 |
| 3,633,601 A * | 1/1972 | Vez | ....................... | A61M 16/00 137/81.2 |
| 3,693,649 A | 9/1972 | Gordon et al. | | |
| 3,780,622 A | 12/1973 | Vogel | | |
| 3,788,400 A * | 1/1974 | Tufts | .................... | A62C 35/645 251/44 |
| 3,943,975 A | 3/1976 | Schnittker | | |
| 3,977,423 A * | 8/1976 | Clayton | ............... | G05D 16/166 137/487 |
| 4,026,327 A * | 5/1977 | Deinlein-Kalb | ...... | F01D 17/145 137/219 |
| 4,268,006 A | 5/1981 | Kunz et al. | | |
| 4,450,863 A * | 5/1984 | Brown | ................. | F16K 31/404 251/38 |
| 4,477,051 A * | 10/1984 | Ben-Yehuda | ......... | F16K 31/145 251/30.01 |
| 4,516,604 A | 5/1985 | Taplin | | |
| 4,693,242 A * | 9/1987 | Biard | ..................... | A62B 9/025 251/149.6 |
| 4,699,351 A * | 10/1987 | Wells | .................. | F16K 31/408 251/38 |
| 4,715,578 A | 12/1987 | Seltzer | | |
| 4,817,821 A * | 4/1989 | Simoens | ............. | B65D 88/703 222/3 |
| 4,893,645 A * | 1/1990 | Augustinas | ........... | F16K 31/402 251/285 |
| 4,977,923 A | 12/1990 | Cho | | |
| 5,069,242 A | 12/1991 | Kilgore | | |
| 5,169,117 A * | 12/1992 | Huang | .................. | F16K 31/086 251/38 |
| 5,299,774 A * | 4/1994 | Arneson | ................. | F16K 24/02 251/30.02 |
| 5,299,775 A * | 4/1994 | Kolze | ................ | G05D 16/2095 251/38 |
| 5,431,181 A * | 7/1995 | Saadi | ........................ | E03D 5/10 137/315.07 |
| 5,632,465 A * | 5/1997 | Cordua | ................. | F16K 31/402 251/30.02 |
| 5,732,929 A * | 3/1998 | Luppino | ............... | F16K 31/404 251/38 |
| 5,771,921 A * | 6/1998 | Johnson | .................. | F16K 21/18 251/297 |
| 5,842,501 A * | 12/1998 | Powell | .................. | F16K 31/383 137/489 |
| 5,967,176 A * | 10/1999 | Blann | .................. | F16K 31/365 137/489.5 |
| 5,979,482 A * | 11/1999 | Scott | ...................... | F16K 31/402 137/15.01 |
| 6,161,570 A * | 12/2000 | McNeely | ............. | G05D 16/166 137/491 |
| 6,263,901 B1 * | 7/2001 | Lohde | .................... | F16K 31/402 251/30.02 |
| 6,298,872 B1 | 10/2001 | Keller | | |
| 6,318,406 B1 * | 11/2001 | Conley | .................... | F16K 17/10 251/38 |
| 6,394,412 B2 * | 5/2002 | Zakai | .................... | F16K 31/402 251/30.02 |
| 6,536,533 B2 * | 3/2003 | Reilly | .................... | A62C 35/62 169/17 |
| 6,708,771 B2 * | 3/2004 | Reilly | .................... | A62C 37/44 169/44 |
| 7,690,622 B2 | 4/2010 | Ito et al. | | |
| 8,172,197 B2 | 5/2012 | Gu et al. | | |
| 8,279,080 B2 | 10/2012 | Pitchford et al. | | |
| 8,550,101 B2 * | 10/2013 | Folk | .................... | F16K 31/1262 251/35 |
| 8,596,606 B2 * | 12/2013 | Maercovich | ........... | E03C 1/055 251/38 |
| 8,739,829 B2 * | 6/2014 | Maercovich | ........... | F16K 31/05 251/30.01 |
| 9,297,465 B2 * | 3/2016 | Mevius | ............... | G05D 16/0694 |
| 9,309,992 B2 * | 4/2016 | Bush | ........................ | E03D 1/34 |
| 10,487,486 B2 * | 11/2019 | Funari | ..................... | E03D 5/105 |
| 10,578,228 B2 * | 3/2020 | Block | ................. | F16K 37/0058 |
| 10,587,209 B2 | 3/2020 | Yao | | |
| D883,444 S * | 5/2020 | Block | .......................... | D23/249 |
| 10,753,075 B2 * | 8/2020 | Funari | .................. | F16K 5/0407 |
| 11,079,037 B2 * | 8/2021 | Kunau | ................. | F16K 31/383 |
| 2002/0046774 A1 | 4/2002 | Keller | | |
| 2015/0316345 A1 * | 11/2015 | Brahler, II | ............. | F41B 11/60 124/73 |
| 2016/0040798 A1 * | 2/2016 | Kunau | .................... | F16K 15/20 137/12 |

* cited by examiner

OSCILLATING VALVE

CROSS-REFERENCE TO RELATED APPLICATION

This application claims priority to under 35 U.S.C. § 119, based on U.S. Provisional Patent Application No. 63/130, 967 filed Dec. 28, 2020, titled "Oscillating Valve," the disclosure of which is hereby incorporated by reference.

BACKGROUND OF THE INVENTION

Water meters are typically used to measure water usage at a consumption site for billing and/or monitoring purposes. Water meters may be installed in-line with a piping system. Water-utility-related managed services may use direct communication to radio frequency meter interface units (RF MIUs) in the field. In one aspect, RF MIUs are being considered for applications to remotely turn on or shut off water for individual locations.

DETAILED DESCRIPTION OF THE PREFERRED EMBODIMENTS

The following detailed description refers to the accompanying drawings. The same reference numbers in different drawings identify the same or similar elements. Also, the following detailed description does not limit the invention.

In some instances, remotely operated valves may use a battery power source. Low-power actuation of these remotely operated valves may be required to extend the battery life and achieve required duty cycles for the valve.

Pilot-operated valves are a well-established technology, whereby a solenoid or other actuator opens and closes a pilot valve, effecting a change in pressure that opens and closes a main valve. Pilot-operated valves can be operated with less energy than direct-action solenoid valves. A battery-powered remote shutoff valve (RSV) may use a pilot-operated valve; but the number of open-and-close cycles that can be powered by the battery may be relatively few. Other valve designs may use self-reciprocating mechanisms operated on fluid pressure, such as self-reciprocating hydraulic mechanisms or self-reciprocating pneumatic mechanisms. These designs tend to include check valves and pistons in cylinders with multiple ports which open and close by the action of the cylinders. Most such designs typically are optimized to enable a shaft connected to a piston to do work by applying a force through a distance along its axis. However, there remains a need for a remotely operated valve that can change states with a small expenditure of energy, enabling an extended duty cycle for a battery associated with the actuator.

Systems and methods described herein provide a pilot-operated oscillating valve including a diaphragm. The valve is configured such that when the diaphragm is in a closed position, pressure of a fluid supply opens the valve, and when the diaphragm is in an open position, the pressure of the fluid closes the valve. The oscillating valve may further include an actuator that can cause the valve to be arrested selectively in the open position or the closed position depending on a state of the actuator. The state of the actuator is switchable with a small expenditure of energy, enabling an extended duty cycle for a battery or other power source associated with the actuator. In some implementations described herein, energy from the oscillating movement of the diaphragm may be captured to recharge the battery for the actuator.

Figure 1:
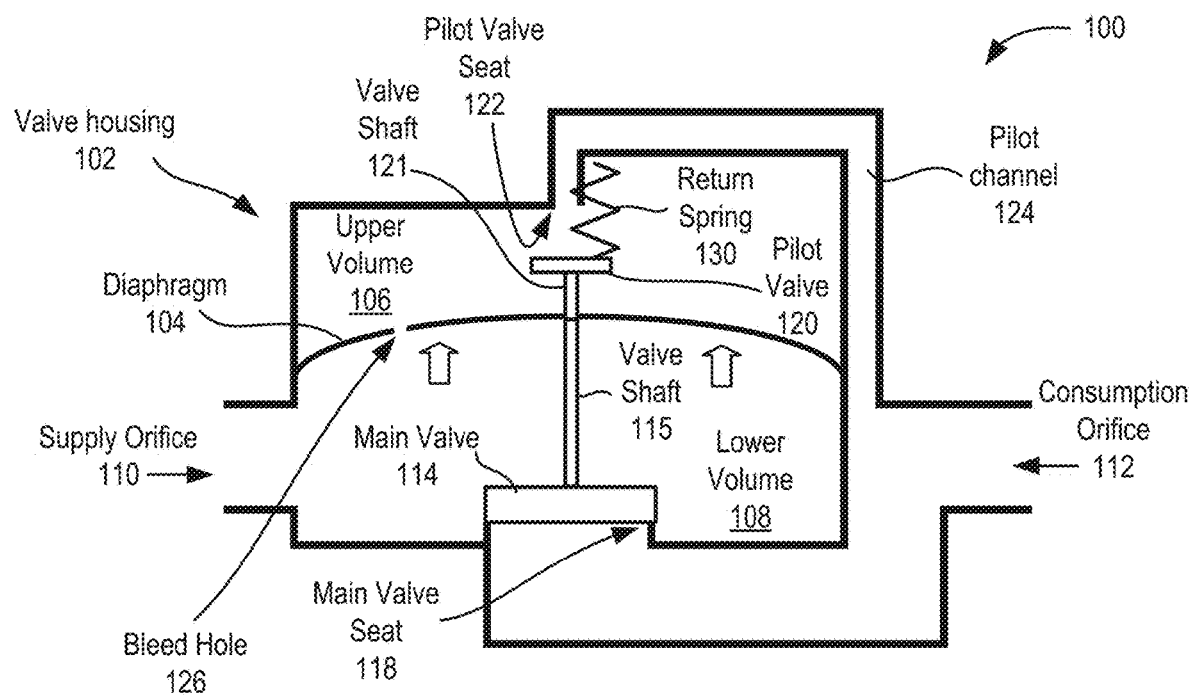
FIG. 1 is a schematic diagram illustrating an oscillating valve according to a first embodiment described herein.

FIG. 1 is a schematic diagram illustrating an oscillating valve 100 according to an embodiment described herein. Oscillating valve 100 (and other oscillating valve embodiments describe herein) may also be referred to as a valve system. Referring to FIG. 1, pilot-operated oscillating valve 100 may include a valve housing 102. Valve housing 102 may be divided internally by a diaphragm 104 into an upper volume 106 (also referred to herein as a first volume) and a lower volume 108 (also referred to herein as a second volume). Housing 102 may also include a supply orifice 110 and a consumption orifice 112. Supply orifice 110 may typically receive a constant fluid supply from, for example, a public or private water system. Demand through consumption orifice 112 may be governed by, for example, water usage at a customer site that is connected to valve 100.

Figure 2A:
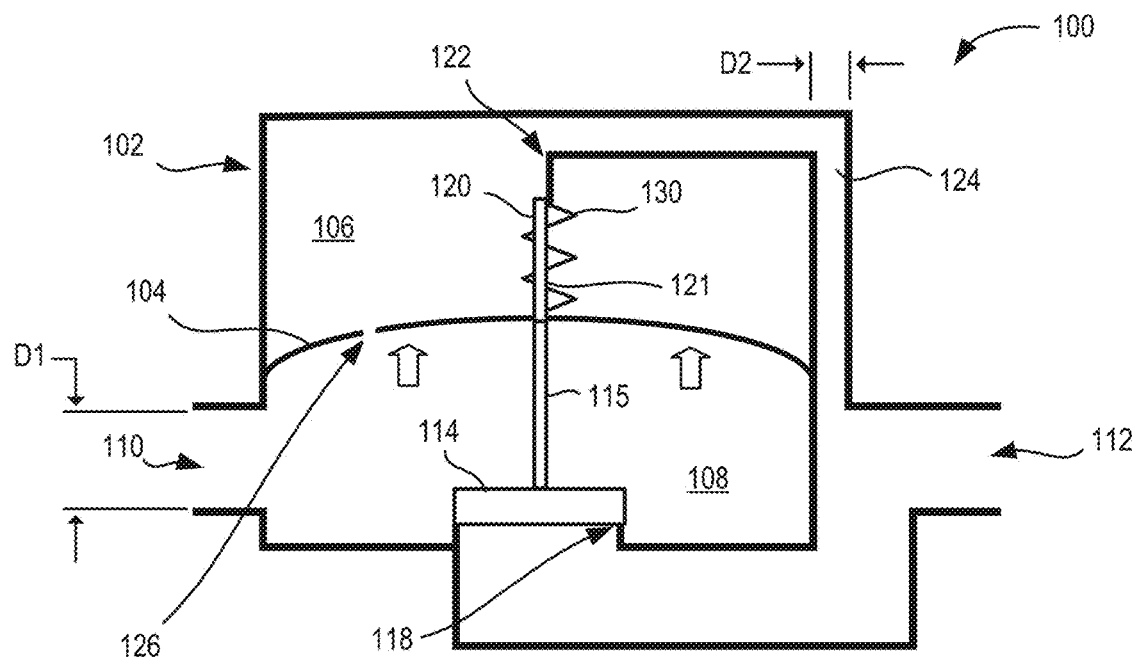
FIGS. 2A-2C are schematic diagrams illustrating an arrangement and operation of an oscillating valve according to a second embodiment described herein.

Supply orifice 110 may feed fluid into lower volume 108, and consumption orifice 112 may expel fluid from lower volume 108. The terms "lower" and "upper" as used herein are for purposes of illustration, and valve housing 102 is not limited by a particular orientation of upper volume 106 and lower volume 108. A pilot (or bypass) channel 124 connects upper volume 106 to consumption orifice 112. As illustrated in FIG. 2A, pilot channel 124 includes a smaller inner diameter (D2) than an inner diameter (D1) of the supply orifice 110. Diaphragm 104 may include a permeable membrane or may include one or more bleed holes 126 to permit a limited transfer rate of fluid between lower volume 108 and upper volume 106. Generally, dimensions of valve 100 may be tuned to achieve, among other performance parameters, a particular desired frequency of oscillation in relation to a pressure difference between the inlet (supply orifice 110) and outlet (consumption orifice 112). Dimensions that may be tuned include, for example, those of valve shaft 121, valve seat 122, pilot channel 124, bleed hole(s) 126, and upper volume 106.

A main valve 114 is connected to diaphragm 104 and positioned within the lower volume 108 between supply orifice 110 and consumption orifice 112. For example, main valve 114 may be connected (or coupled) to diaphragm 104 via a valve shaft 115. Similarly, a pilot valve 120 is connected to diaphragm 104 and positioned within the upper volume 106. For example, pilot valve 120 may be connected (or coupled) to diaphragm 104 via a valve shaft 121. Valve shafts 115/121 are shown for clarity. In other implementations, features of valve shafts 115/121 may be integrated into diaphragm 104, without including valve shafts 115 and/or 121.

Valve housing 102 may be formed from a substantially rigid material, such as a plastic material or metal material. In another implementation, valve housing 102 may be formed from an elastomeric polymer with a sufficient thickness to resist deformation at pressures in upper volume 106 and lower volume 108. In one implementation, valve housing 102 may generally have the shape of an enclosed cylinder with an axis generally parallel to valve shafts 115/121. Diaphragm 104 may be formed using a same or different material than valve housing 102. Diaphragm 104 may be less-rigid than valve housing 102 to permit deformation of diaphragm 104, as described herein.

Main valve 114 intermittently engages with a main valve seat 118 to block or permit flow from supply orifice 110 to consumption orifice 112. Pilot valve 120 intermittently engages with a pilot valve seat 122 at the entrance of pilot channel 124 to block or permit flow from upper volume 106 to consumption orifice 112. According to an implementation, diaphragm 104, main valve 114, main valve seat 118 are axially aligned within housing 102 to optimize axial displacement of main valve 114/diaphragm 104.

Fluid (e.g., water) pressure entering supply orifice 110 typically exceeds pressure exiting consumption office 112. For example, according to one implementation, supply pressure may generally be at least 0.5 atmospheres higher than pressure exiting consumption orifice 112. A return spring 130 provides a force (e.g., downward in the configuration of FIG. 1) against diaphragm 104. Return spring 130 may be implemented as a coil spring, a leaf spring, or another type of spring that provides bias against expansion of diaphragm 104 into upper volume 106.

According to one implementation, pilot valve 120 is actuated by a feature of diaphragm 104, or a part directly or indirectly attached to the diaphragm. As shown in FIG. 1, pilot channel 124 may connect consumption orifice 112 to a upper volume 106 above diaphragm 104, with an end of the pilot channel situated at pilot valve seat 122 above the center of diaphragm 104 and oriented axially to diaphragm 104, such that pilot channel 124 is blocked by pilot valve 120 when diaphragm 104 is raised and opened (or unblocked) when diaphragm 104 is lowered. According to an implementation, diaphragm 104, pilot valve 120, and pilot valve seat 122 may be axially aligned within housing 102. Alternatively, as shown in FIG. 2A, an outlet of pilot channel 124 at pilot valve seat 122 may be oriented perpendicular to the axial motion of diaphragm 104, and a feature of the diaphragm, or a part directly or indirectly attached to the diaphragm (e.g., pilot valve 120), may slide over pilot valve seat 122 at the end of pilot channel 124 when diaphragm 104 is raised, and slide so as to uncover the end of the pilot channel 124 at pilot valve seat 122 when diaphragm 104 is lowered. Although described herein primarily in the context of a flexible diaphragm, in other implementations the function of diaphragm 104 may be accomplished with another moving component, such as a piston.

Figure 2B:
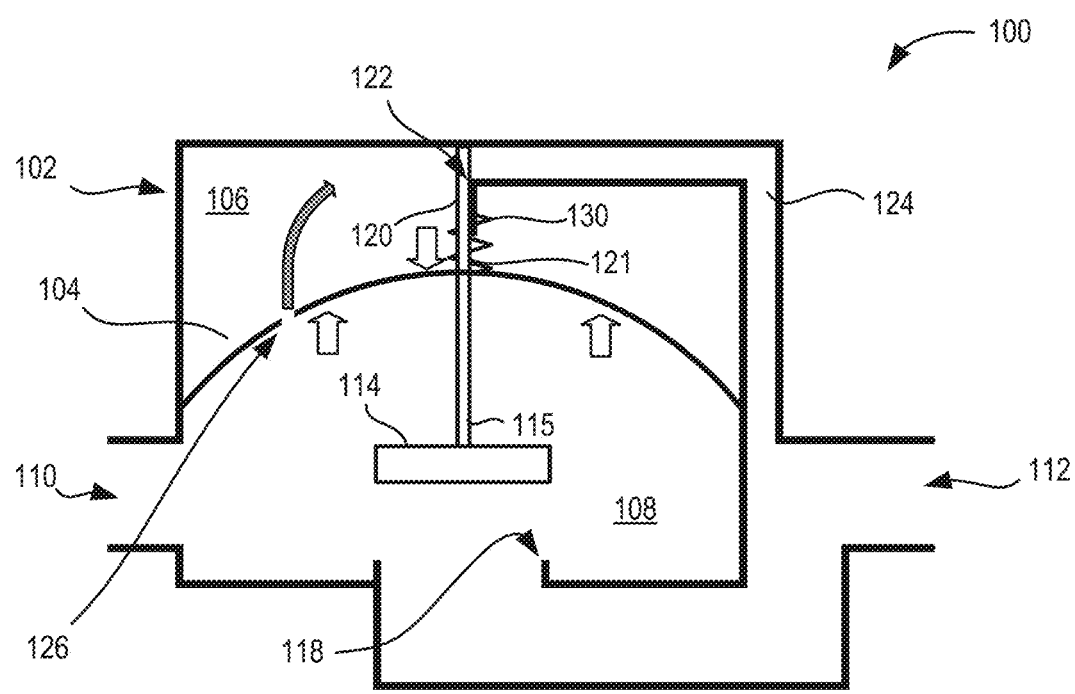
Figure 2C:
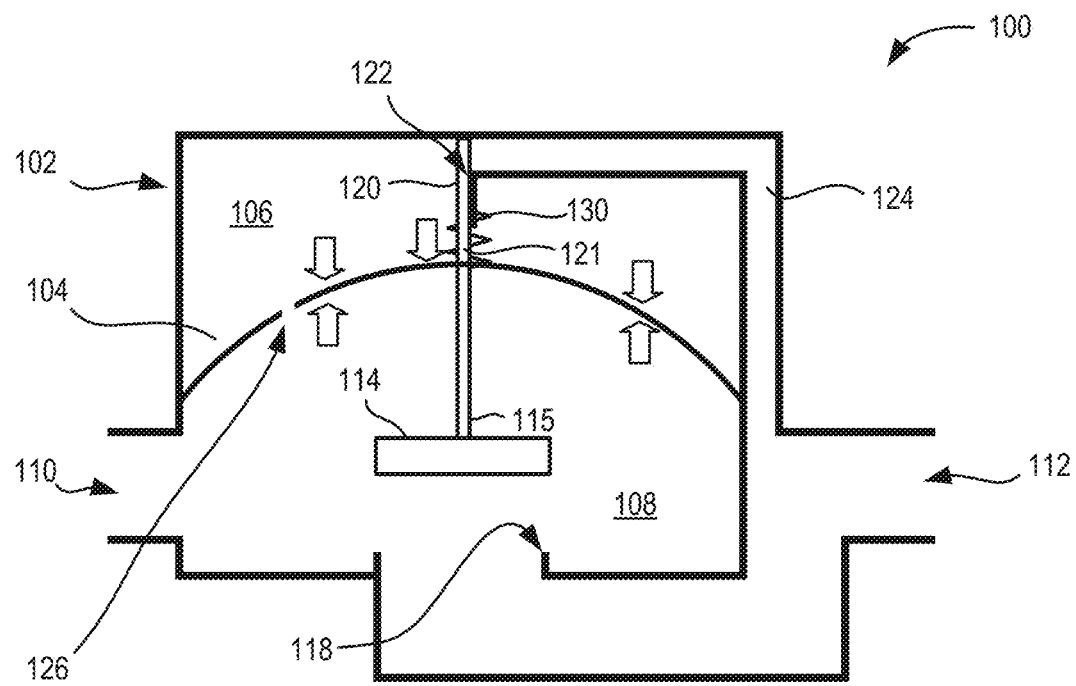

As illustrated in FIGS. 2A through 2C, oscillating valve 100 may oscillate according to the following sequence of events when fluid flow into and out of valve 100 (e.g., when output from consumption orifice 112 is open at a consumer site). Referring to FIG. 2A, with pilot valve 120 open, pressure above diaphragm 104 (e.g., upper volume 106) may be caused to drop substantially below a supply pressure in lower volume 108. The total force due to the supply pressure below diaphragm 104 in lower volume 108 may exceed the total force due to the pressure above diaphragm 104 in upper volume 106, causing the center of diaphragm 104 to rise. As illustrated in FIG. 2B, the movement of diaphragm 104 simultaneously opens main valve 114, closes pilot valve 120, and compresses return spring 130.

As further shown in FIG. 2B, with pilot valve 120 is closed, fluid seeps through bleed hole 126 or another restricted flow path through or around diaphragm 104. The increase of fluid in upper volume 106 causes the pressure above diaphragm 104 to rise, as shown in FIG. 2C. Eventually, the pressure above diaphragm 104, in combination with the force of return spring 130, is sufficient to force diaphragm 104 down, closing main valve 114 and opening pilot valve 120, returning to the positions shown in FIG. 2A. Then open pilot valve 120 causes the pressure above diaphragm 104 to drop, and the oscillation cycle repeats.

Figure 3A:
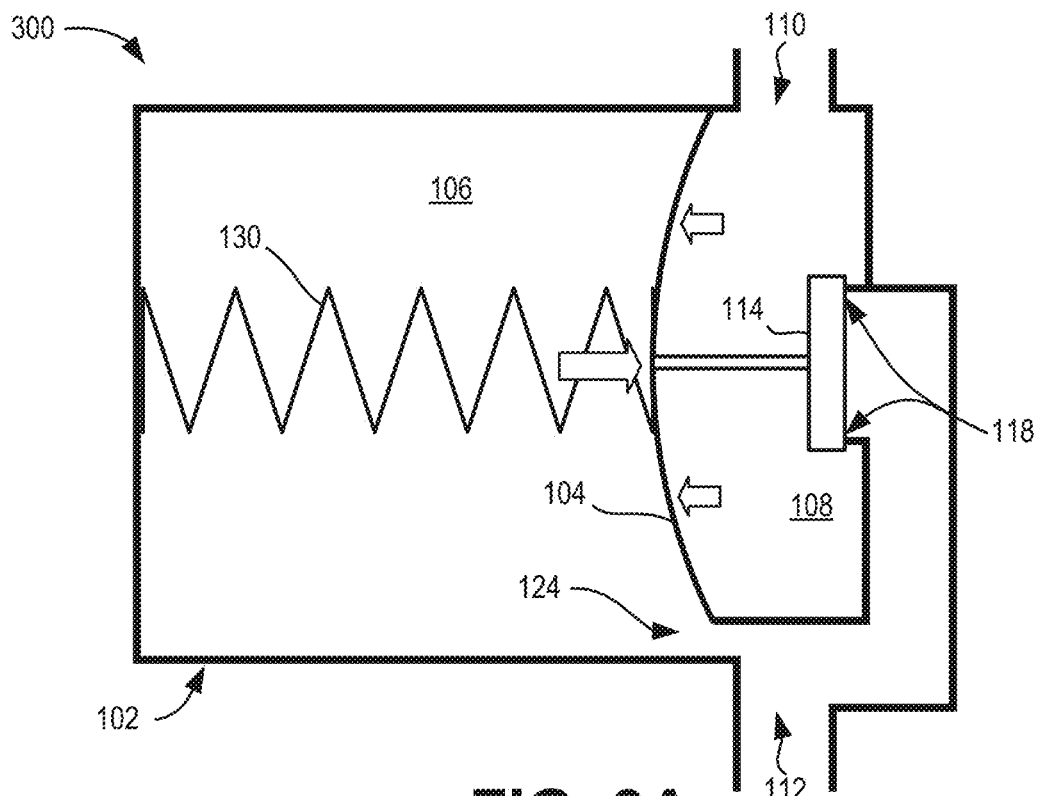
FIGS. 3A-3C are schematic diagrams illustrating an arrangement and operation of an oscillating valve according to a third embodiment described herein.
Figure 3B:
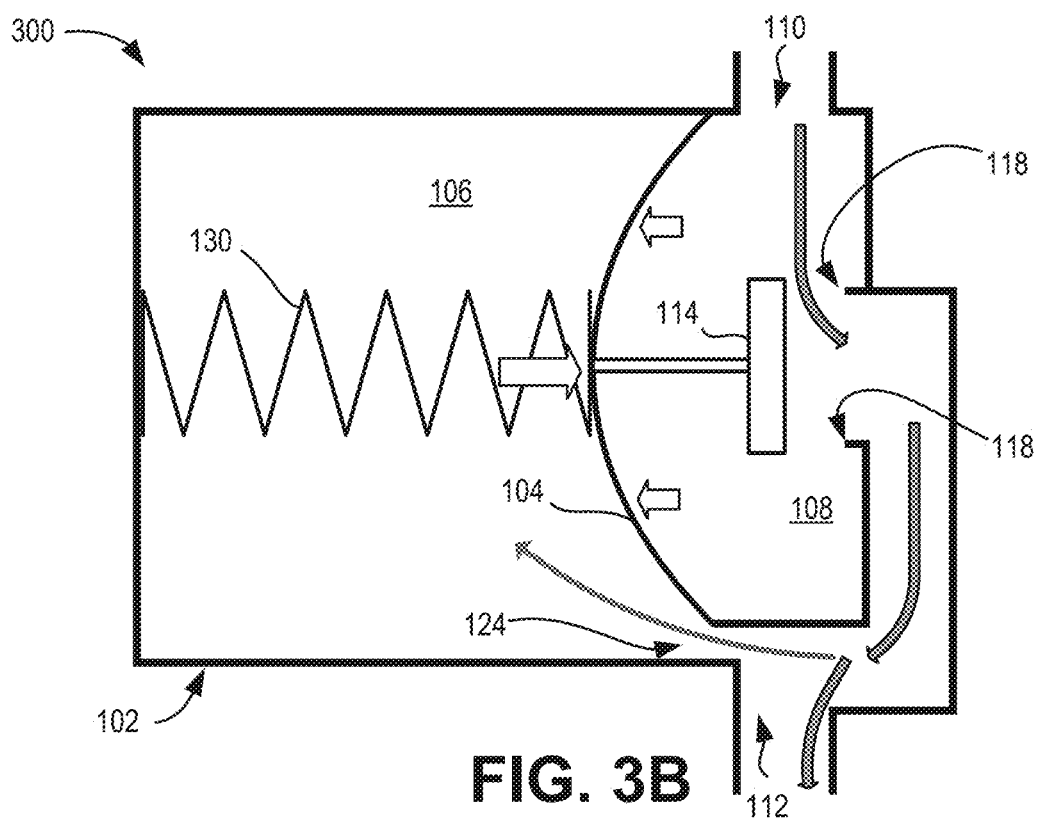
Figure 3C:
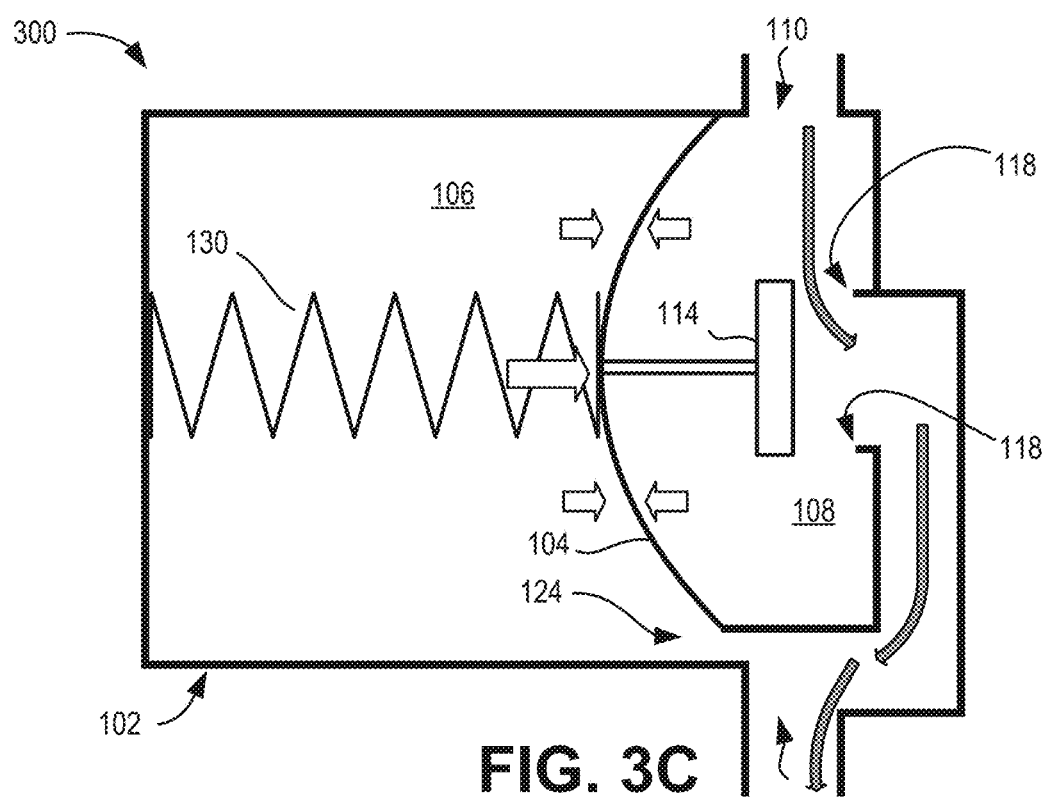

FIGS. 3A-3C are schematics of a pilot-operated oscillating valve 300 according to another implementation. Pilot-operated oscillating valve 300 may include components similar to pilot-operated oscillating valve 100, including valve housing 102 with upper volume 106 and lower volume 108 divided by diaphragm 104. Similar to FIG. 1, housing 102 may include supply orifice 110 and consumption orifice 112. Main valve 114 is connected to diaphragm 104 and positioned within the lower volume 108 between supply orifice 110 and consumption orifice 112. Supply orifice 110 may feed fluid into lower volume 108, and consumption orifice 112 may expel fluid from lower volume 108, where the inlet pressure at supply orifice 110 generally exceeds the outlet pressure at consumption orifice 112. Main valve 114 connected to diaphragm 104 intermittently engages with a main valve seat 118 to block or permit flow from supply orifice 110 to consumption orifice 112. A return spring 130 provides a force (e.g., from left to right in the configuration of FIG. 3A) against diaphragm 104.

Pilot channel 124 connects upper volume 106 to consumption orifice 112. As shown in FIGS. 3A-3C, pilot channel 124 of valve 300 is configured to be permanently open. That is, no pilot valve is included in oscillating valve 300. Furthermore, in contrast to oscillating valve 100, there is no bleed hole or other means for passage of fluid through or around the diaphragm 104.

As illustrated in FIGS. 3A through 3C, oscillating valve 300 may oscillate according to the following sequence of events. Referring to FIG. 3A, with the main valve 114 closed, a pressure in upper volume 106 may be caused to drop substantially below a supply pressure in lower volume 108. The total force due to the supply pressure in lower volume 108 may exceed the total force due to the pressure in upper volume 106, causing the center of diaphragm 104 to expand into upper volume 106 (e.g., from right to left if FIG. 3A), opening main valve 114 and compressing return spring 130. With main valve 114 open, as shown in FIG. 3B, fluid flows from supply orifice 110 to consumption orifice 112. Furthermore, fluid seeps through pilot channel 124 into upper volume 106, causing the pressure in upper volume 106 to rise, as illustrated in FIG. 3C. Eventually, the pressure in upper volume 106, in combination with the force of return spring 130, is sufficient to move diaphragm 104 (e.g., from left to right in FIG. 3C), closing main valve 114. The closure of main valve 114 returns valve 300 to the position of FIG. 3A, which allows fluid to exit upper volume 106 via pilot channel 124. Loss of fluid causes the pressure in upper volume 106 drop, which causes the oscillation cycle to repeat.

FIGS. 4A-4D are schematics of a pilot-operated oscillating valve 400 according to another implementation. For valve 400, a valve 100 according to the embodiments of FIGS. 1-3C or any similar embodiment, may be caused to arrest specifically in an open position or a closed position. Particularly, in FIGS. 4A-4D, valve 400 includes an armature 402 which is connected to an actuator 404 to hold main valve 114 in an open or closed position.

According to an implementation, actuator 404 may be configured to receive signals from a radio frequency meter interface unit (RF MIU) to control the state (e.g., open, closed, neutral, etc.) of valve 400 (or another oscillating valve described herein). For example, an RF MIU (not shown) may provide a signal for actuator 404 to turn on or shut off fluid (e.g., water) to a site serviced through consumption orifice 112. According to another implementation, actuator 404 may be combined with a controller, such as a controller for an RF MIU.

Actuator 404 may be connected to a power source 406, such as a battery. According to an implementation, actuator 404 may include a solenoid, a mechanical latching mechanism, an electrostatic actuator, or another type of actuator. In another implementation, actuator 404 may incorporate a micro latching mechanism. According to an implementation, armature 402 may include a rocker switch to toggle pins 408a and 408b (referred to herein collectively as pins 408) between a closed position of main valve 114 (FIG. 4A) and an open position of main valve 114 (FIG. 4B). Actuator 404 may shift armature 402 such that spring-loaded pins 408 or snaps can line up with valve shaft 121 (or a respective hole/protrusion therein) to retain main valve 114 in a desired position.

Figure 4A:
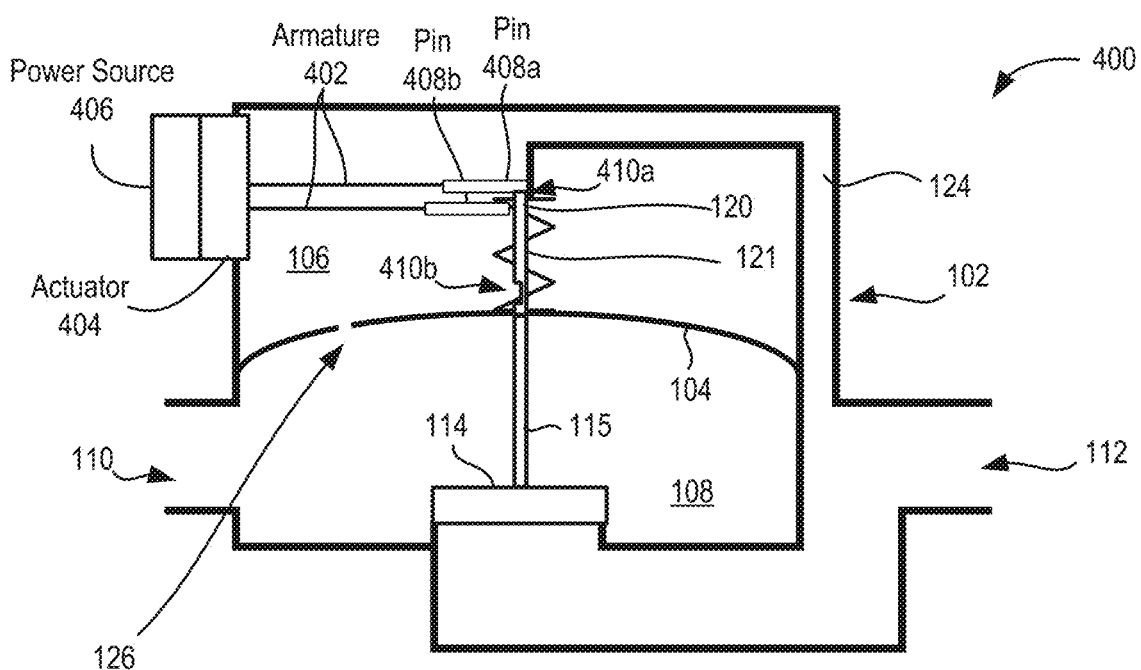
FIGS. 4A-4F are schematic diagrams illustrating an arrangement and operation of an oscillating valve according to a fourth embodiment described herein.
Figure 4B:
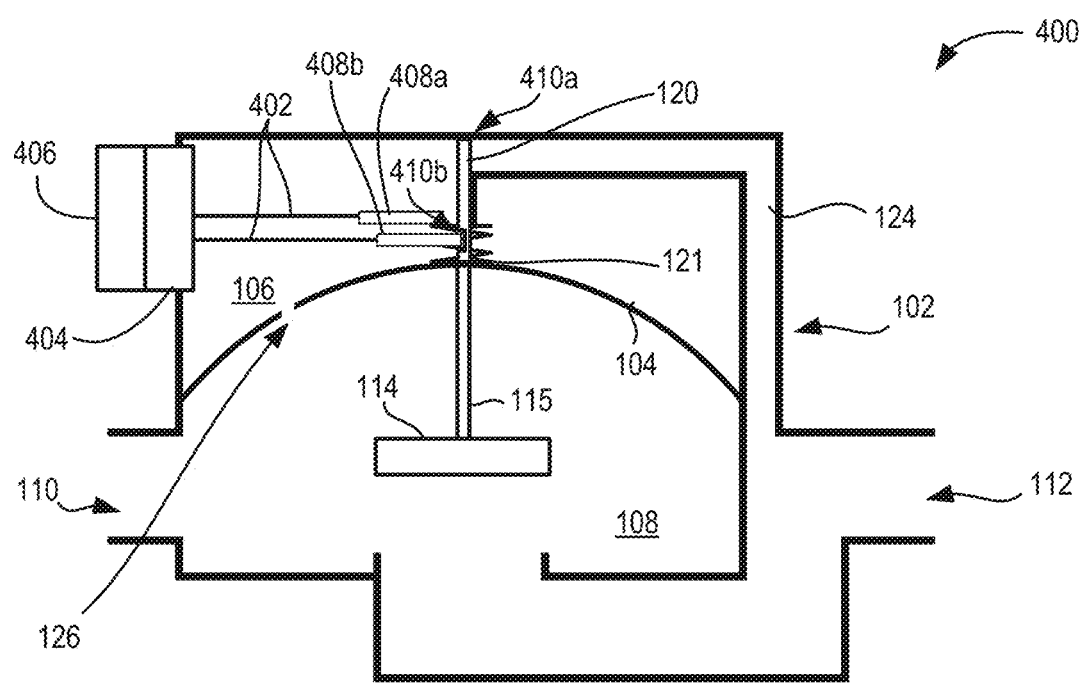

As shown in FIGS. 4A and 4B, a first aspect for arresting main valve 114 in an open or closed position may involve the application of at least one spring-loaded pin 408 relative to one or more features 410a and 410b (referred to herein collectively as features 410) on valve shaft 121. Depending on the implementation, features 410 may include, for example, a hole, detent, indentation, protrusion, or end. One of spring-loaded pins 408 may slide along the surface of valve shaft 121 until one of pins 408 aligns with feature 410. Then the spring causes the pin 408 to extend into or against feature 410, such that pin 408 prevents further vertical motion of valve shaft 121/diaphragm 104. As shown in FIG. 4A, an upper pin 408a may extend past feature 410a (e.g., an end of valve shaft 121) to hold main valve 114/diaphragm 104 in a closed position. As shown in FIG. 4B, when upper pin 408a is removed from engaging feature 410a (e.g., by actuator 404), a lower pin 408b may engage feature 410b (e.g., a hole in valve shaft 121) when pressure in lower volume 108 forces diaphragm 104 and valve shaft 121 upward.

Figure 4C:
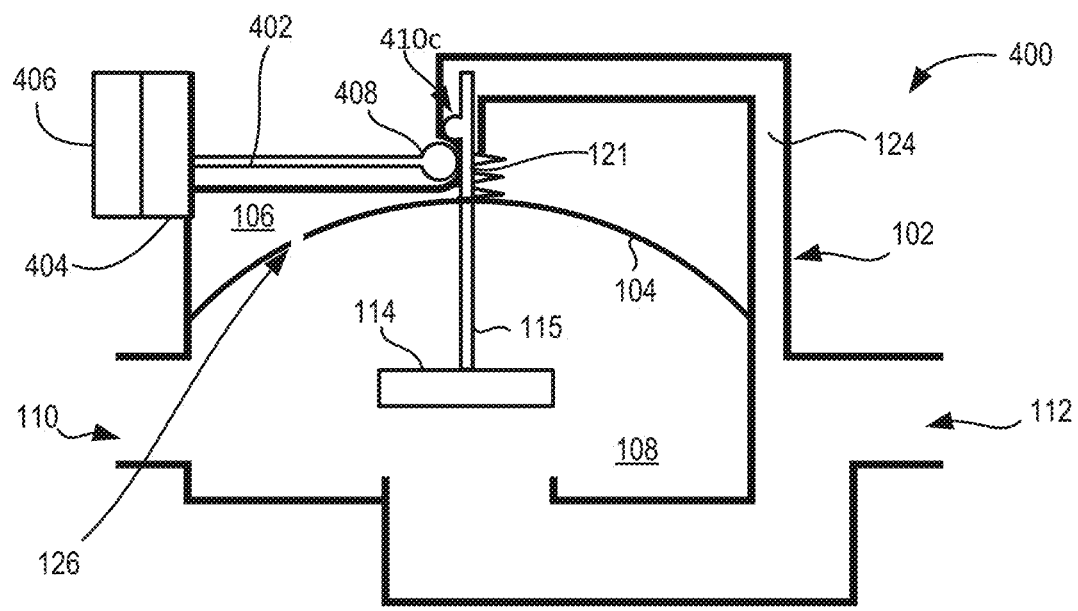
Figure 4D:
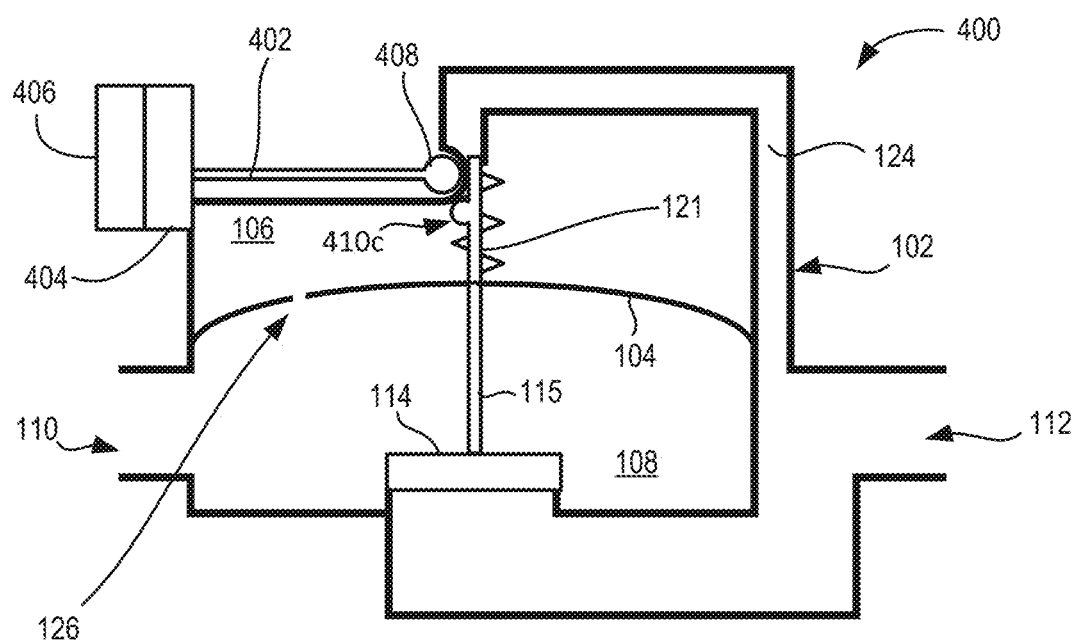

As shown in FIGS. 4C and 4D, a second aspect for arresting main valve 114 in an open or closed position may use a single pin 408 and feature 410c in the form of a raised boss on valve shaft 121. Pin 408 may be moved above or below feature 410c (e.g., the boss) at an appropriate time, such that the boss may not pass pin 408, preventing further vertical motion of diaphragm 104/main valve 114.

Figure 4E:
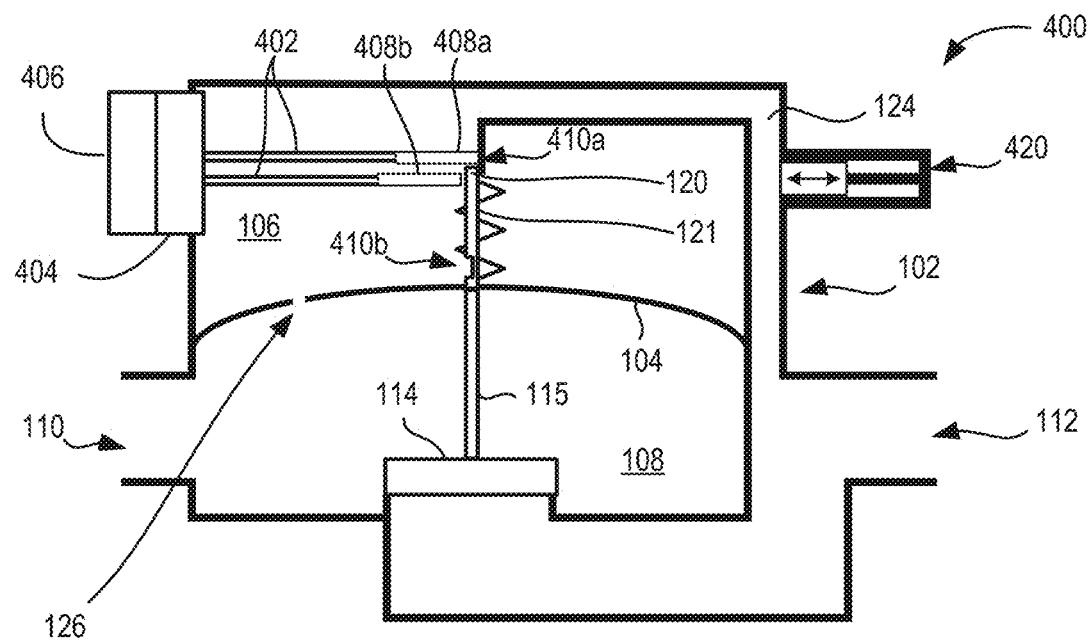

The configuration of FIGS. 4A-4D allows for some flow through diaphragm 104 (e.g., via bleed hole 126) when the main valve 114 is in the closed position. Such an arrangement provides an operational choice between an open state and a closed restricted-flow state (e.g., when movement of diaphragm 104 is arrested in a particular position). According to another implementation, an option for a fully closed state with valve 400 may be added by including an additional valve in pilot channel 124. For example, as shown in FIG. 4E, valve 420 may be included as part of pilot channel 124. According to one implementation, valve 420 may be actuated independently of pins 408 to prevent restricted flow from bleed hole 126 from exiting pilot channel 124 when main valve 114 is in a closed state.

Figure 4F:
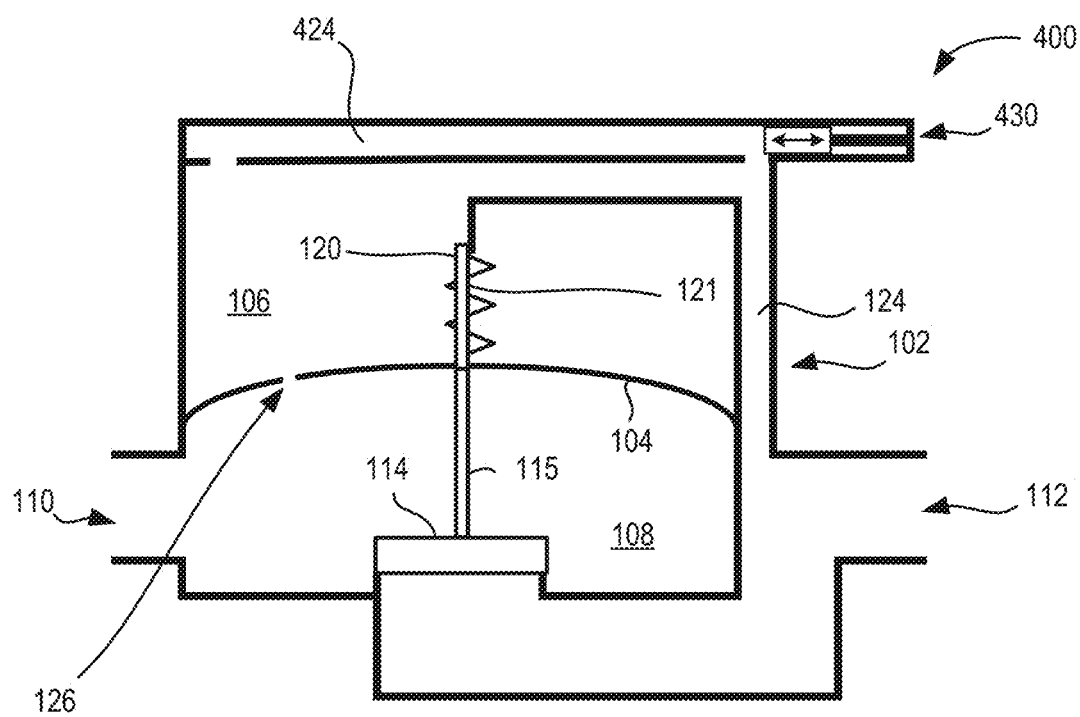

According to another implementation, as shown in FIG. 4F, a pilot bypass channel 424 may be included in valve 400. In contrast with FIG. 4E, for example, no mechanical control (e.g., actuator 404) is provided for pilot valve 120 in FIG. 4F. Instead, valve 430 may control bypass of pilot valve 120 using pilot bypass channel 424. Valve 430 may be actuated independently (e.g., by actuator 404 or another actuator, not shown) to permit restricted flow from bleed hole 126 into exiting pilot channel 124 when pilot valve 120 is in a closed state. When valve 430 is open, pressure in upper volume 106 does not increase and pilot valve 120 is ineffective at closing main valve 114. Thus, continuous flow from supply orifice 110 to consumption orifice 112 would be permitted. When valve 430 is moved to a closed position, pilot valve 120 may operate as described above in connection with, for example, FIGS. 2A-2C. Thus, without mechanical control of pilot valve 120 (or, equivalently, with mechanical controls set to neutral), a restricted flow state maybe selectively disabled in the configuration of FIG. 4F.

FIGS. 5A-5D are schematics of a pilot-operated oscillating valve 500 according to another implementation. For valve 500, a valve 300 according to the embodiments of FIGS. 3A-3C or any similar embodiment, may be caused to arrest with main valve 114 in an open position or a closed position. Particularly, in FIGS. 5A-5D, valve 500 includes a hook 501 and a movable latch 504. Latch 504 may be connected to actuator 404. Actuator 404 may adjust the position of latch 504 to hold main valve 114 in an open or closed position. Actuator 404 may be powered by power source 406.

Hook 501 may be implemented as a feature of valve shaft 121, which, similar to the configuration of FIG. 1, may be integral with or attached to diaphragm 104. Hook 501 may include an inner surface 503 and an outer surface 502. Latch 504 may include a snap hook 506 and a protrusion 508.

Figure 5A:
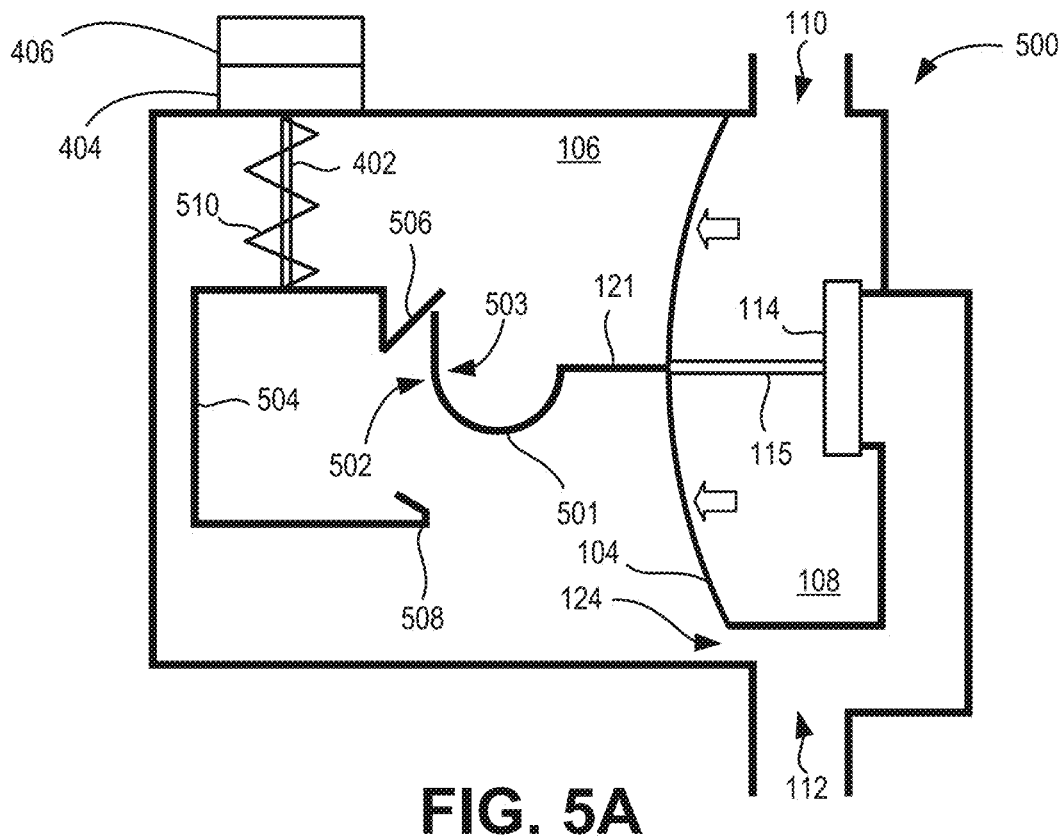
FIGS. 5A-5D are schematic diagrams illustrating an arrangement and operation of an oscillating valve according to a fifth embodiment described herein.
Figure 5B:
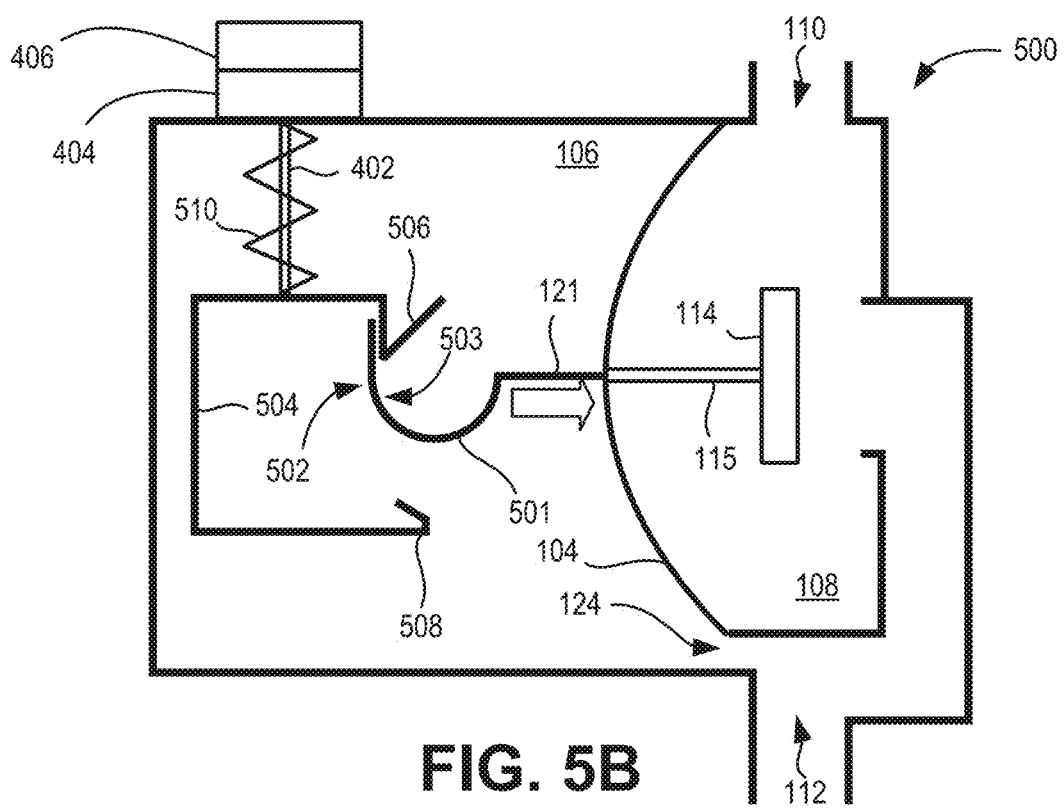
Figure 5C:
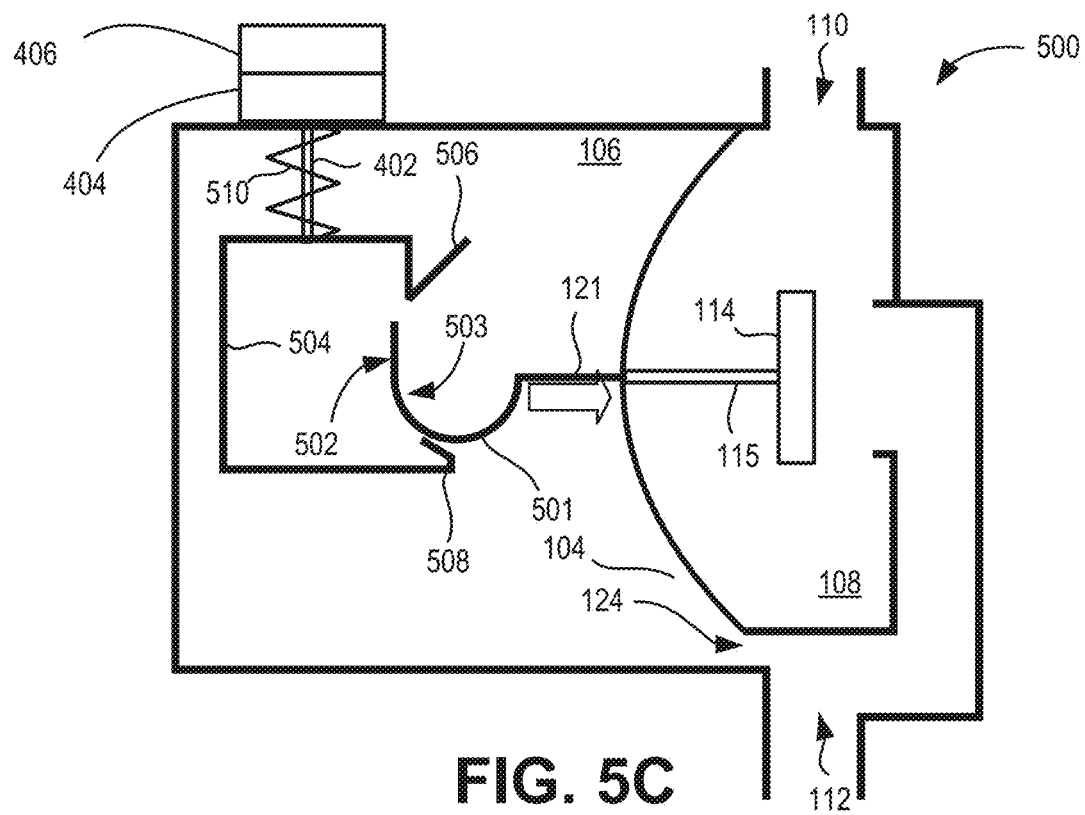

Referring to FIG. 5A, pressure from lower volume 108 may push diaphragm 104/hook 501 toward latch 504 when main valve 114 is in a closed position. Referring to FIG. 5B, with latch 504 in one position, the snap hook 506 engages with an inner surface 503 of the hook 501 so as to prevent the diaphragm 104 from moving away from the open position. More particularly, hook 501 may push against an inclined surface of snap hook 506 to displace latch 504 and force of a spring 510 may return latch 504 to a position that engages inner surface 503 of hook 501. As shown in FIG. 5C, actuator 404 may move latch 504 to release hook 501 from snap hook 506 and permit closing of main valve 114 under oscillating conditions described, for example, in connection with FIGS. 3A-3C. Return spring 130, which may provide addition return force, is not shown in FIGS. 5A-5D, for clarity.

Figure 5D:
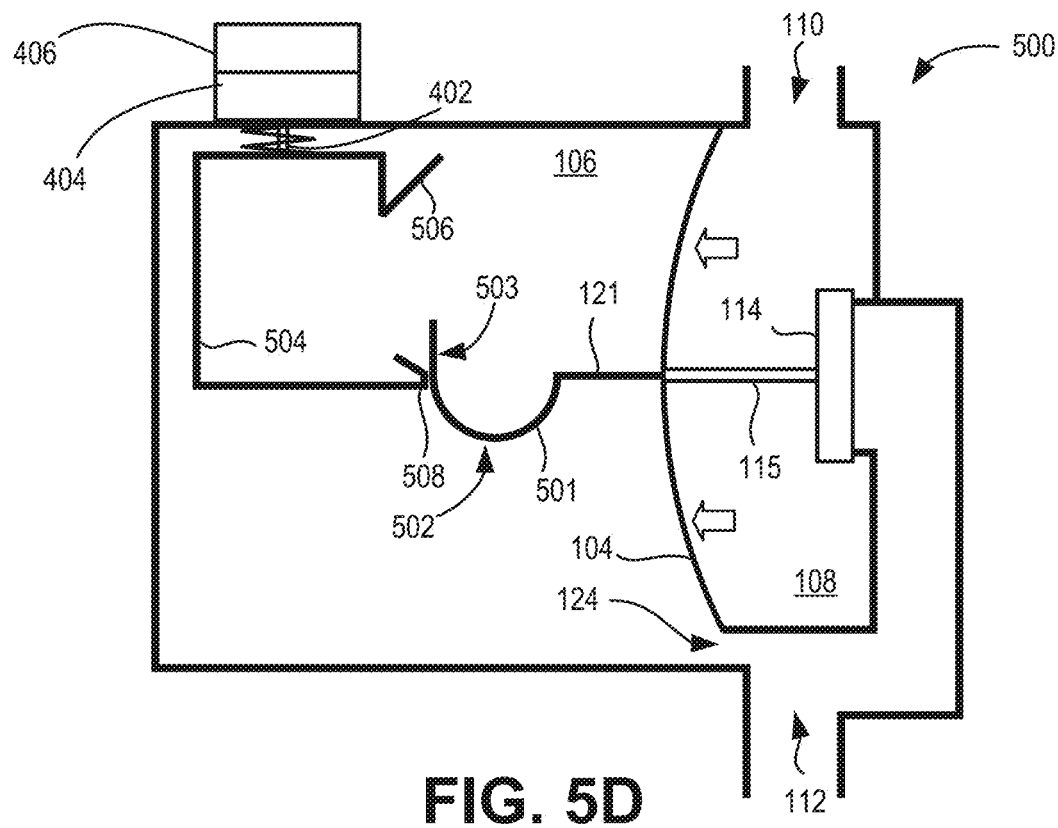

Referring to FIG. 5D, with main valve 114 in a closed position, latch 504 may be moved to another position such that protrusion 508 engages with outer surface 502 of hook 501 so as to prevent diaphragm 104 from moving out from a closed position. Actuator 404 may position latch 504 to a neutral position (e.g., FIG. 5C) to enable continuous oscillation of valve 500.

In embodiments of FIGS. 4A-5D or other embodiments, actuator 404 may initiate a transition to a state that will cause the valve to arrest in an open position (e.g., an open state), and another transition to a state that will cause the valve to arrest in a closed position (e.g. a closed state with either restricted flow or no flow to consumption orifice 112). By avoiding an arrangement whereby either transition must operate against the pressure of the fluid, actuation to arrest the valve may be achieved with a small amount of energy for actuation.

Figure 6:
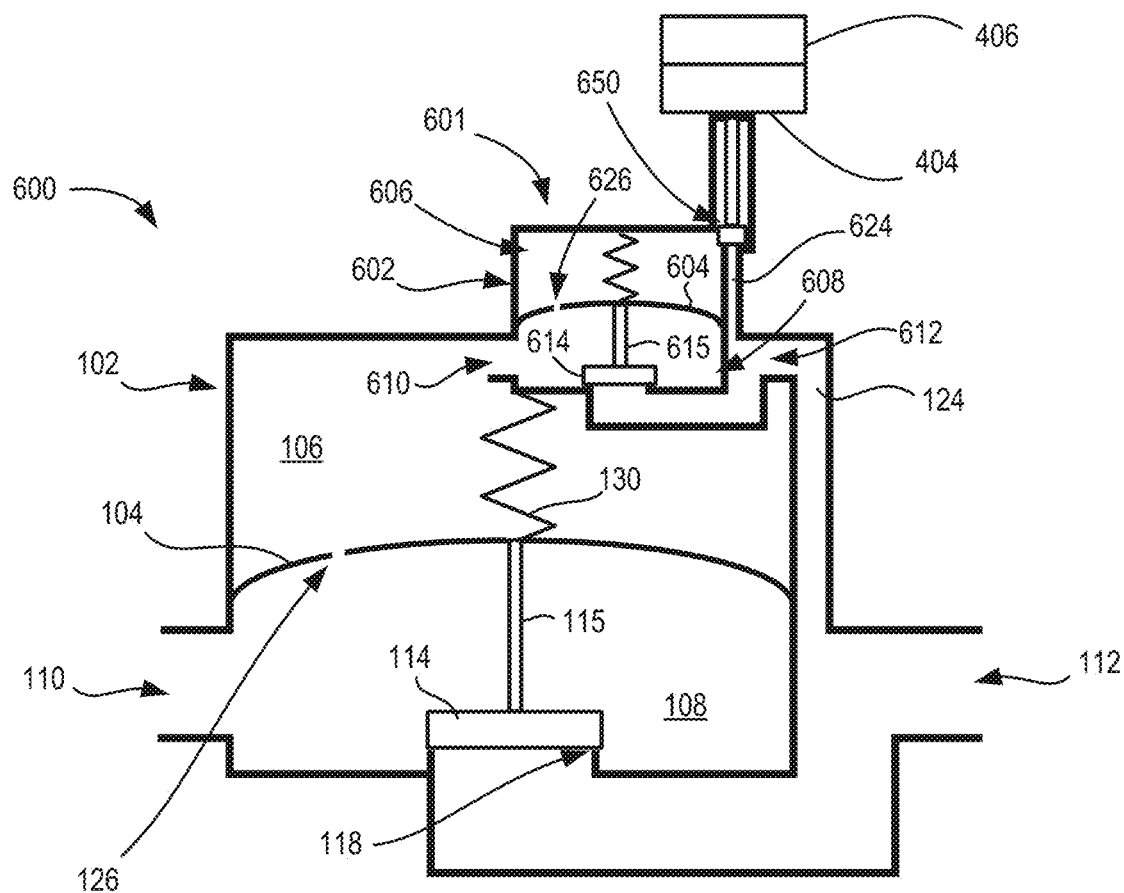
FIG. 6 is a schematic diagram illustrating an oscillating valve according to a sixth embodiment described herein.

FIG. 6 is a schematic of a three-stage pilot-operated oscillating valve 600 according to another implementation. Pilot-operated oscillating valve 600 may include components similar to pilot-operated oscillating valve 100, including valve housing 102 with upper volume 106 and lower volume 108 divided by diaphragm 104. Also similar to FIG. 1, housing 102 may include supply orifice 110 and consumption orifice 112. Main valve 114 is connected to diaphragm 104 and positioned within the lower volume 108 between supply orifice 110 and consumption orifice 112. Return spring 130 provides a force against expansion diaphragm 104, and pilot channel 124 connects upper volume 106 to consumption orifice 112.

Valve 600 may additionally include a booster valve 601 and a pilot valve 650. Booster valve 601 may include, for example, a reduced-scale version of oscillating valve 100. Booster valve 601 may be included along pilot channel 124 to control flow supply flow into pilot channel 124. As illustrated in FIG. 6, booster valve 601 may be an oscillating valve including a valve housing 602 divided internally by a diaphragm 604 into an upper volume 606 and a lower volume 608. Housing 602 may also include a pilot supply orifice 610 and a pilot discharge orifice 612. Pilot supply orifice 610 may receive fluid from upper volume 606 into lower volume 608, and pilot discharge orifice 612 may expel fluid from lower volume 608 toward consumption orifice 112. Bypass channel 624 connects upper volume 606 to pilot discharge orifice 612. Similar to diaphragm 104, diaphragm 604 may include a permeable membrane or bleed holes 626 to permit a limited transfer rate of fluid between lower volume 608 and upper volume 606.

A boost valve 614 is connected to diaphragm 604 and positioned within lower volume 608 between pilot supply orifice 610 and pilot discharge orifice 612. For example, boost valve 614 may be connected to diaphragm 604 via a valve shaft 615. A pilot valve 650 is positioned to control fluid flow from upper volume 606 of booster valve 601 into bypass channel 624. For example, pilot valve 650 may be connected to actuator 404, which may selectively control fluid flow to reduce pressure in upper volume 606.

Booster valve 601 may oscillate in a manner similar to the cycle of valve 100, but with control of pilot valve 650 being independent of the position of boost valve 614 and/or main valve 114. The configuration of valve 600 may further reduce the amount of required energy to actuate pilot valve 650 (e.g., in comparison with the arrangement of valve 400 in FIG. 4A), allowing for a larger number of cycles to be achieved with a battery power source (e.g., power source 406).

Figure 7:
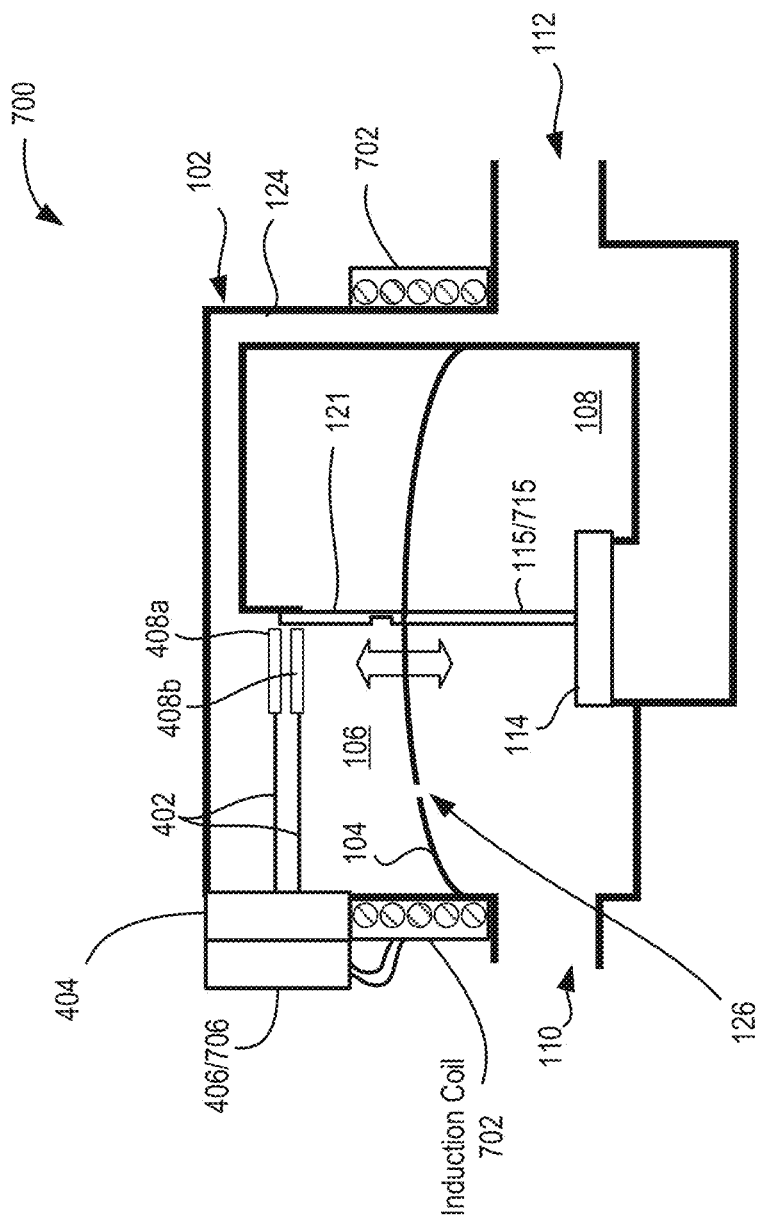
FIG. 7 is a schematic of an energy-harvesting pilot-operated oscillating valve 700 according to another implementation.

FIG. 7 is a schematic of an energy-harvesting pilot-operated oscillating valve 700 according to another implementation. In the configuration of FIG. 7, oscillating valve 700 may harvest energy from the oscillating motion of diaphragm 104 to charge a battery (e.g., power source 406). More particularly, the control scheme of may be augmented to harvest energy from the oscillating motion via the principle of magnetic induction.

In the example of FIG. 7, oscillating valve 700 may be configured similar to oscillating valve 400, with the addition of an induction coil 702. One or more of valve shafts 115 and 121 may be configured as a magnet 715. Oscillation of diaphragm 104 may cause reciprocating linear motion of magnet 715 within induction coil 702 to generate electricity. Additionally, in oscillating valve 700, power source 406 may be configured as recharging system 706, which may receive and store electrical power from induction coil 702.

In valve 700, actuator 404/armature 402 may be configured to provide a selectable neutral orientation for pins 408a/408b. That is, in addition to the open and closed control states described in connection with FIGS. 4A-4D, the neutral orientation provides a third control state that may permit oscillation of diaphragm 104/magnet 715 in accordance with principles described above when fluid flows through valve 700.

Figure 8:
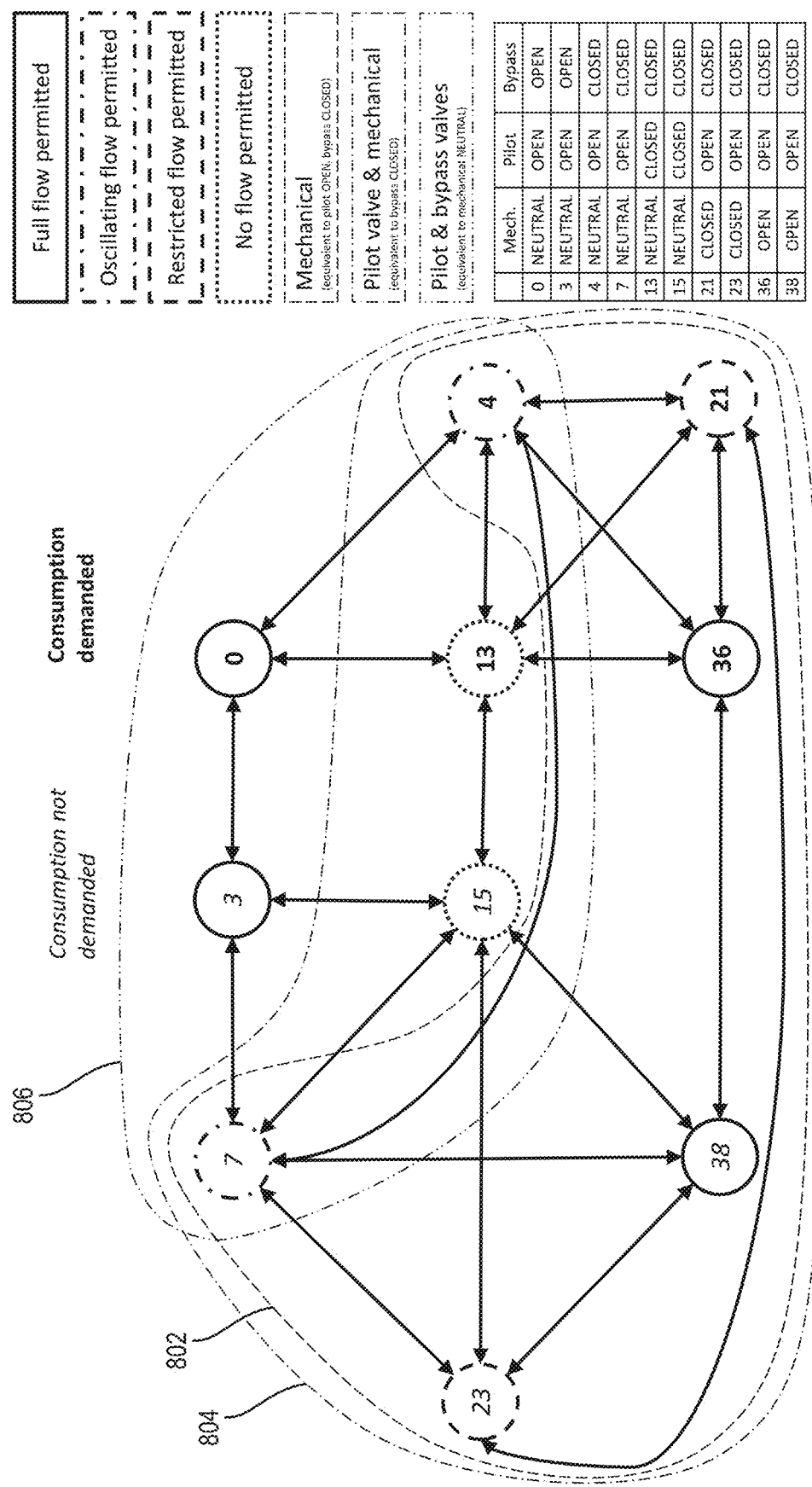
FIG. 8 is a schematic illustrating operation of an oscillating valve according to the embodiment of FIG. 7.

FIG. 8 provides a schematic illustration for controlling an oscillating valve in an OPEN-CLOSED configuration or an OPEN-LIMIT configuration (e.g., where "limit" is a closed restricted-flow state), such as the configurations of FIGS. 4A-4F and FIG. 7. In FIG. 8, valve 400/700 may provide valve-based control (e.g., controlling pilot valve 120, valve 420, or valve 430) as an alternative or a counterpart to mechanical controls (e.g., oscillation as initiated via demand through consumption orifice 112). Different states (shown as circles 0, 3, 4, 7, 13, 15, 21, 23, 36, and 38) may correspond to the collective state of main valve 114, pilot valve 120, and valve 420/pilot channel 124 (FIG. 4E).

In states 0, 3, 36 and 38, full (uninterrupted) flow is permitted (e.g., through main valve 114 of oscillating valve 400/700). In states 4 and 7, oscillating flow is permitted through main valve 114 of oscillating valve 400/700. During oscillating fluid flow through valve 700, for example, reciprocating linear motion of magnet 715 within induction coil 702 charges battery 406 of recharging system 706. In states 21 and 23, restricted flow is permitted (e.g., through pilot channel 124 of oscillating valve 400/700). During restricted flow, fluid through oscillating valve 400/700 is limited to the amount of fluid that can pass through pilot channel 124/bleed hole(s) 126. In states 13 and 15, no flow is permitted through oscillating valve 400/700.

Control of the implementation according to FIG. 4A is represented in a region 802 of FIG. 8, including states 7, 23, 38, 36, and 21, which correspond variously to oscillating flow, restricted flow, and full flow. FIG. 8 also illustrates control of the implementation according to FIG. 4E in a region 804, where oscillating valve 400 includes valve 420 in pilot channel 124. Region 804 is shown including states 7, 13, 15, 23, 38, 36, and 21, where states 13 and 15 entirely prevent flow.

FIG. 8 further illustrates control of the implementation according to FIG. 4F in a region 806, where valve 430 controls a bypass of pilot valve 120 via pilot bypass channel 424. Region 806 is shown including states 0, 3, 4, 7, 13, and 15. When the directly controllable valve 430 is open, pilot valve 120 is ineffective at closing main valve 114 so full flow is always permitted, per states 0 and 3. When valve 430 is closed, the states 7, 15, 13, and 4 are accessible, corresponding variously to oscillating flow and no flow.

Figure 9:
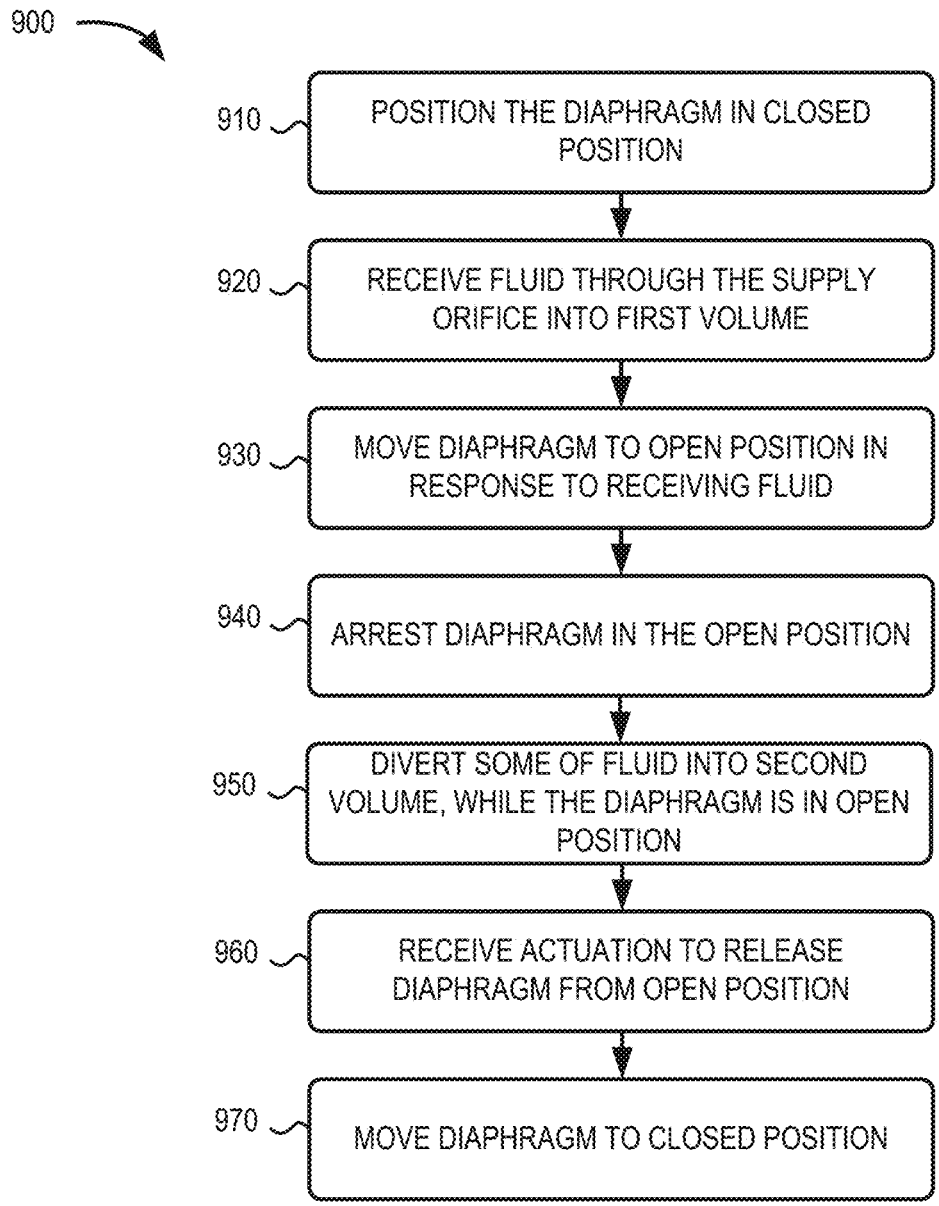
FIG. 9 is a flow diagram illustrating an exemplary process for operating an oscillating valve according to an implementation described herein.

FIG. 9 is a process flow illustrating an exemplary process 900 for operating an oscillating valve according to an implementation described herein. In one implementation, process 900 may be performed by oscillating valve 400. In other implementations, process 900 may be performed by one or more of oscillating valves 100, 300, 500, 600, 700, for example.

Process 900 may include positioning a diaphragm in a closed position (block 910). For example, oscillating valve 400 may be configured with diaphragm 104 in a default closed position, which causes main valve 114 to prevent fluid flow through lower volume 108 from supply orifice 110 to consumption orifice 112.

Process 900 may also include receiving fluid through the supply orifice into a first volume (block 920), and moving the diaphragm to an open position in response to receiving the fluid (block 930). For example, oscillating valve 400 may receive fluid through supply orifice 110, while an output from consumption orifice 112 is open. Pressure of the fluid into supply orifice 110 is typically greater than pressure of the fluid exiting the consumption orifice 112. Pressure of fluid in lower volume 108 may cause diaphragm 104 to move to an open position, which causes main valve 114 to permit fluid flow through lower volume 108 from supply orifice 110 to consumption orifice 112.

Process 900 may further include arresting the diaphragm in the open position (block 940), and diverting some of the fluid into a second volume while the diaphragm is in the open position (block 950). For example, oscillating valve 400 may automatically arrest diaphragm 104 in the open position by engaging pin 408b with feature 410b during diaphragm oscillation. While diaphragm 104 is in the open position fluid in upper volume 106 is prevented from exiting pilot channel 124. Bleed hole 126 may permit fluid from lower volume 108 to be diverted into upper volume 106, creating increased pressure in upper volume 106.

Process 900 may additionally include receiving actuation to release the diaphragm from the open position (block 960), and moving the diaphragm to the close position (block 970). For example, actuator 404 may cause oscillating valve 400 to release diaphragm 104, and pressure in upper volume 106 may force diaphragm 104 to move to the closed position. The alternating pressure differentials between lower volume 106 and upper volume 108 are the primary drivers moving diaphragm 104. Thus, actuator 404 uses minimal energy to control the state (e.g., open, closed, neutral) of oscillating valve 400. In some implementations, as shown, for example, in FIG. 7, energy from movement of diaphragm 104 may be captured to recharge a battery 406 for actuator 404.

A valve system described herein includes a housing that defines an internal space. The housing includes a supply orifice that continuously receives fluid and a consumption orifice where fluid exits the housing. The valve system also includes a diaphragm dividing the internal space into a first volume and a second volume, wherein the supply orifice is configured to supply fluid into the first volume. The valve system also includes a pilot channel connecting the second volume to the consumption orifice, wherein the pilot channel includes a smaller inner diameter than a diameter of the supply orifice. The valve system further includes a return spring biased against expansion of the diaphragm into the second volume and a main valve connected to the diaphragm. The diaphragm may move between a closed position, which causes the main valve to prevent fluid flow through the first volume from the supply orifice to the consumption orifice, and an open position, which causes the main valve to permit fluid flow through the first volume from the supply orifice to the consumption orifice. When the diaphragm is in the closed position and an output from the consumption orifice is open, fluid pressure in the first volume may force the diaphragm toward the open position. When the diaphragm is in the open position and an input into the supply orifice is open, fluid pressure in the second volume may force the diaphragm toward the closed position.

The foregoing description of implementations provides illustration and description, but is not intended to be exhaustive or to limit the invention to the precise form disclosed. Modifications and variations are possible in light of the above teachings or may be acquired from practice of the invention.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A valve system comprising:
    a housing defining an internal space, the housing including a supply orifice that receives fluid and a consumption orifice;
    a diaphragm dividing the internal space into a first volume and a second volume, wherein the supply orifice is configured to supply fluid into the first volume;
    a pilot channel connecting the second volume to the consumption orifice, wherein the pilot channel includes a smaller inner diameter than a diameter of the supply orifice;
    a return spring biased against expansion of the diaphragm into the second volume;
    a main valve connected to the diaphragm;
    a shaft attached on an opposite side of the diaphragm from the main valve;
    a latch configured to engage with the shaft to arrest movement of the diaphragm; and
    an actuator configured to adjust a position of the latch,
    wherein the diaphragm moves between a closed position, which causes the main valve to prevent fluid flow through the first volume from the supply orifice to the consumption orifice, and an open position, which causes the main valve to permit fluid flow through the first volume from the supply orifice to the consumption orifice,
    wherein, when the diaphragm is in the closed position and an output from the consumption orifice is open, fluid pressure in the first volume forces the diaphragm toward the open position,
    wherein, when the diaphragm is in the open position and an input into the supply orifice is open, fluid pressure in the second volume forces the diaphragm toward the closed position, and
    wherein the actuator adjusts the position of the latch to selectively arrest movement of the diaphragm.

2. The valve system of claim 1, wherein the diaphragm comprises one or more bleed holes that permit fluid flow through the diaphragm.

3. The valve system of claim 2, further comprising:
    a pilot valve connected to the diaphragm,
    wherein the pilot valve permits fluid flow through the pilot channel when the diaphragm is in the closed position, and
    wherein the pilot valve prevents fluid flow through the pilot channel when the diaphragm is in the open position.

4. The valve system of claim 3, wherein the shaft couples the pilot valve to the diaphragm, and
    wherein the actuator is configured to engage a feature on one of the pilot valve or the shaft to prevent movement of the diaphragm.

5. The valve system of claim 1, wherein the actuator is further configured to selectively:
    arrest the diaphragm in the closed position, or
    arrest the diaphragm in the open position.

6. The valve system of claim 1, wherein the diaphragm does not permit fluid transfer between the first volume and the second volume.

7. The valve system of claim 1, wherein the actuator configured to selectively move the latch to:
    arrest the diaphragm in the closed position,
    arrest the diaphragm in the open position, and
    permit oscillation of the diaphragm between the closed position and the open position.

8. The valve system of claim 1, further comprising:
    a battery that powers the actuator.

9. The valve system of claim 8, further comprising:
    a recharging system to harvest energy from oscillation of the diaphragm.

10. The valve system of claim 8, wherein the shaft comprises a magnet, the valve system further comprising:
    an induction coil, wherein motion of the diaphragm moves the magnet to generate electric current.

11. The valve system of claim 1, further comprising:
    a booster valve in line with the pilot channel, wherein the booster valve includes a booster diaphragm and a booster pilot channel; and
    a pilot valve in line with the booster pilot channel.

12. The valve system of claim 11, wherein the pilot valve is controlled independently from a position of the diaphragm and a position of the booster diaphragm.

13. The valve system of claim 1, wherein the housing defines a substantially cylindrical internal space, and
    wherein the diaphragm is axially aligned with a valve seat for the main valve.

14. The valve system of claim 13, further comprising:
    a pilot valve connected to the diaphragm, wherein the diaphragm is axially aligned with a valve seat for the pilot valve.

15. A method performed by an oscillating valve system that includes a housing defining an internal space, the housing including a supply orifice that receives fluid and a consumption orifice; a diaphragm dividing the internal space into first volume and a second volume, wherein the supply orifice is configured to supply fluid into the first volume; a pilot channel connecting the second volume to the consumption orifice, wherein the pilot channel includes a smaller inner diameter than a diameter of the supply orifice; a return spring biased against expansion of the diaphragm into the second volume; a main valve connected to the diaphragm, a shaft attached on an opposite side of the diaphragm from the main valve, a latch configured to engage with the shaft to arrest movement of the diaphragm, and an actuator for the latch, the method comprising:
    positioning the diaphragm in a closed position, which causes the main valve to prevent fluid flow through the first volume from the supply orifice to the consumption orifice;
    receiving fluid into the supply orifice while an output from the consumption orifice is open, wherein pressure of the fluid into the supply orifice is greater than pressure of the fluid exiting the consumption orifice;
    moving, in response to receiving the fluid, the diaphragm to an open position, which causes the main valve to permit fluid flow through the first volume from the supply orifice to the consumption orifice;
    automatically arresting, via the latch, the diaphragm in the open position;
    diverting, while the diaphragm is in the open position, some of the fluid received from the supply orifice into the second volume; and
    releasing, via the actuator the diaphragm from the open position to allow movement of the diaphragm to the closed position in response to increased pressure in the second volume.

16. The method of claim 15, further comprising:

harvesting electrical energy from an oscillating motion of the diaphragm.

17. A valve system comprising:

a housing defining an internal space, the housing including a supply orifice that receives fluid and a consumption orifice;

a diaphragm dividing the internal space into a first volume and a second volume, wherein the supply orifice is configured to supply fluid into the first volume;

a pilot channel connecting the second volume to the consumption orifice, wherein the pilot channel includes a smaller inner diameter than a diameter of the supply orifice;

a main valve connected to the diaphragm;

a pilot valve;

a shaft coupling the pilot valve to the diaphragm; and an actuator configured to selectively arrest the diaphragm in an open position or a closed position, wherein the diaphragm comprises one or more bleed holes that permit fluid flow through the diaphragm, wherein the diaphragm moves between the closed position, which causes the main valve to prevent fluid flow through the first volume from the supply orifice to the consumption orifice, and the open position, which causes the main valve to permit fluid flow through the first volume from the supply orifice to the consumption orifice, wherein the pilot valve permits fluid flow through the pilot channel when the diaphragm is in the closed position and prevents fluid flow through the pilot channel when the diaphragm is in the open position, wherein, when the diaphragm is in the closed position and an output from the consumption orifice is open, fluid pressure in the first volume forces the diaphragm toward the open position, wherein, when the diaphragm is in the open position and an input into the supply orifice is open, fluid pressure in the second volume forces the diaphragm toward the closed position, and wherein the actuator is configured to engage a feature on one of the pilot valve or the shaft to prevent movement of the diaphragm.

18. The valve system of claim 17, further comprising:

a return spring biased against expansion of the diaphragm into the second volume.

19. The valve system of claim 17, further comprising:

a battery that powers the actuator.

20. The valve system of claim 17, wherein the housing defines a substantially cylindrical internal space, and wherein the diaphragm is axially aligned with a valve seat for the main valve.

* * * * *